(12) United States Patent
Cunningham

(10) Patent No.: US 6,863,110 B1
(45) Date of Patent: Mar. 8, 2005

(54) METHOD AND APPARATUS FOR REMOVING VEHICLE WHEEL

(75) Inventor: Charles L. Cunningham, Nashville, TN (US)

(73) Assignee: Service Station Products Company, Wilmington, DE (US)

( * ) Notice: Subject to any disclaimer, the term of this patent is extended or adjusted under 35 U.S.C. 154(b) by 16 days.

(21) Appl. No.: 10/286,444

(22) Filed: Nov. 1, 2002

Related U.S. Application Data

(60) Provisional application No. 60/335,718, filed on Nov. 1, 2001.

(51) Int. Cl.[7] ............................................. B60C 25/04
(52) U.S. Cl. .............................. 157/1; 157/1.1; 157/1.3
(58) Field of Search ........................... 157/1, 1.1, 1.17, 157/1.3, 1.43, 1.47, 1.48, 11; 7/166; 254/15, 17, 25, 131

(56) References Cited

U.S. PATENT DOCUMENTS 1,220,659 A * 3/1917 Mansbach .................. 157/1.22
6,237,666 B1 * 5/2001 Magnani ..................... 157/1.3
6,609,293 B2 * 8/2003 Corghi ......................... 29/802
2002/0185235 A1 * 12/2002 Spaggiari .................... 157/1.3

FOREIGN PATENT DOCUMENTS

EP 1048496 A1 * 11/2000 ......... B60C/25/132
EP 1236589 A2 * 9/2002 ......... B60C/25/138

* cited by examiner

Primary Examiner—David B. Thomas
(74) Attorney, Agent, or Firm—Nelson Mullins Riley & Scarborough

(57) ABSTRACT

A method of separating the bead of a tire from a rim to which it is mounted in a tire/rim combination. One step of the method involves providing a tire lifting device having a working end including a rigid bead puller and a flexible positioner. Next, a sidewall of the tire is depressed, such as via a roller, in order to produce a gap between the bead and the rim. The working end of the tire lifting device is then inserted into the gap such that the flexible positioner engages the rim and the bead puller engages the bead. Finally, the tire pulling device is moved such that the bead is pulled over the rim.

12 Claims, 4 Drawing Sheets

METHOD AND APPARATUS FOR REMOVING VEHICLE WHEEL

This application claims the benefit of provisional application Ser. No. 60/335,718, filed Nov. 1, 2001, which is relied on herein and incorporated herein by reference.

BACKGROUND OF THE INVENTION

The present invention relates to the art of removing tires from the rim in a tire/rim combination. More particularly, the present invention relates to improvements in the manner in which a tire bead is separated from the rim.

Over the last several years, Michelin has introduced a new style of tire/rim combination referred to as the Pax® system. Both the rim and tire of the Pax system are different from conventional tire/rim combinations. Moreover, the Pax system includes an internal support ring that functions to prevent unseating of the tire even with a sudden loss of pressure.

It is generally more difficult to remove a Pax system tire from the special rim than it is to remove a conventional tire from a standard rim. This is because conventional tubeless tire systems utilize a rim with a drop center to assure easy tire removal and replacement. The same physical feature is not present on a Pax system tire. With the Pax system, the tire's outer bead must be forced off of the rim first via levers and in a controlled manner. The internal support ring and inside bead are then removed via lateral force from an external roller.

It will thus be appreciated that removal of the first bead in the service or replacement of a Pax tire requires significant skill by the service person. In all cases the first procedure is to loosen the tire's bead from the rim and apply a thin liquid lubricant. This is typically accomplished by forcing a roller inboard against the tire bead creating a small gap between the tire bead and the rim. The service person then applies liquid lubricant into this opening around the entire bead diameter.

One of the earliest techniques for removal of a Pax system tire has involved the use of two levers to flip the bead up and over the edge of the rim. The tools are first inserted into the tire/rim intersection as the roller is pressing the tire from the rim. Next, the roller is moved away from the intersection and the two levers are maneuvered in a way to flip the bead from the rim. Considering that the Pax rim design has a small retainer lip on the outside edge, the lift levers could (and in many cases did) damage this surface. This brought on the use of protective clips made from plastic or metal. Often, however, the plastic only lasted a few times before deforming. Moreover, when using the protective clips, the operator was required to control two levers and two clips. This required a great deal of skill in a difficult situation.

A second approach for removal of a Pax system tire was to use a horseshoe device that had two bead lift profiles attached to one lever. This was also difficult to use and required skill to set in place for the bead lift process. This device also required protective rim clips.

A third known device is a single lever made from steel with a full jacket of plastic. The plastic is multipiece and screwed together. The plastic device allows protection and is allowed to slip in and out on the metal lift tool by a precise distance to assure rim protection and allow the tool to grasp the backside of the bead. However, on many attempts, the complete tool will be expelled by the tire's bead which requires the operator to reset the bead roller and reset the tool.

SUMMARY OF THE INVENTION

The present invention recognizes and addresses the foregoing disadvantages, and others, of prior art constructions and methods.

According to one aspect, the present invention provides a method of separating the bead of a tire from a rim to which it is mounted in a tire/rim combination. One step of the method involves providing a tire lifting device having a working end including a rigid bead puller and a flexible positioner. Next, a sidewall of the tire is depressed, such as via a roller, in order to produce a gap between the bead and the rim. The working end of the tire lifting device is then inserted into the gap such that the flexible positioner engages the rim and the bead puller engages the bead. Finally, the tire pulling device is moved such that the bead is pulled over the rim.

According to exemplary methodology, the tire lifting device comprises an elongate rod defining both the bead puller and an integral handle portion. The flexible positioner may be carried on the elongate rod in such embodiments. For example, the flexible positioner may form a portion of a slidable boot located on the elongate rod. In this case, the inserting step may be performed by: first, moving the slidable boot with respect to the elongate rod to seat the positioner; and second, moving the bead puller into engagement with the tire's bead.

The bead puller may preferably be configured defining a hooking lip at an end thereof. The flexible positioner may define a seating protrusion oriented in an opposite direction from the hooking lip. In such embodiments, the seating protrusion may be seated in a bead groove of the rim during the inserting step.

According to another aspect, the present invention provides a tire lifting device comprising an elongate rod having a handle portion integrally extending into a bead puller defining a hooking lip at an end thereof. A positioner, defining a seating protrusion oriented in an opposite direction to the hooking lip, is carried by the elongate rod. In addition, the positioner is pivotable between a first position angularly spaced from the bead puller and a second position juxtaposed thereto.

In some exemplary embodiments, the positioner may form a portion of a slidable boot located on the elongate rod. For example, the slidable boot may comprise a tubular portion through which the elongate rod is received. In such embodiments, the positioner may extend integrally from the tubular portion. Preferably, the slidable boot may be made of a flexible polymeric material.

Other objects, features and aspects of the present invention are provided by various combinations and subcombinations of the disclosed elements, as well as methods of utilizing same, which are discussed in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
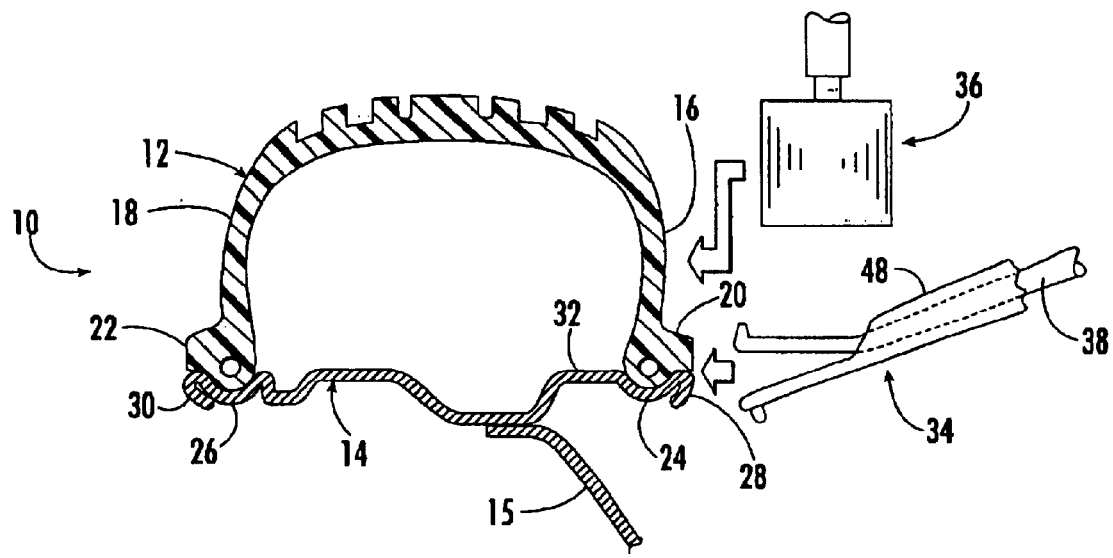
FIG. 1 is a fragmentary cross sectional view of a tire/rim combination showing a tire lifting device and bead roller utilized to remove the tire's outer bead.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary embodiments.

Referring to FIG. 1, a tire/rim combination 10 includes a tire 12 mounted to a rim 14. Rim 14 forms part of a vehicle wheel including a hub 15. In this case, combination 10 is a Pax system combination rather than a standard tire/rim combination as have been widely used for many years. Accordingly, tire 12 has relatively short sidewalls 16 and 18 which terminate in respective beads 20 and 22. Rather than being located behind wide rim flanges, beads 20 and 22 are seated in corresponding grooves 24 and 26. Grooves 24 and 26 are bounded on the outside by small retaining lips 28 and 30, respectively.

As known to those skilled in the art, standard rims will have a drop center adjacent to the surface where the tire's outside bead is seated. In a Pax system rim, however, there is no drop center in the area 32 immediately behind outside bead 20. As a result, removal of outside bead 20 from rim 14 presents numerous difficulties. These difficulties are overcome utilizing a novel tire lifting device 34 according to the methodology described herein. A roller 36 is also preferably utilized to depress sidewall 16 during the bead removal process.

Figure 2:
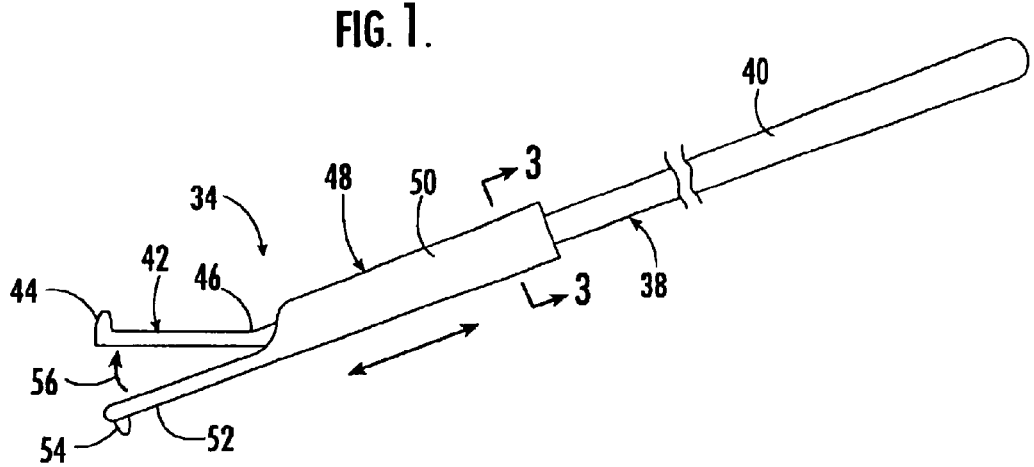
FIG. 2 is an elevational view of a tire lifting device constructed in accordance with the present invention.
Figure 3:
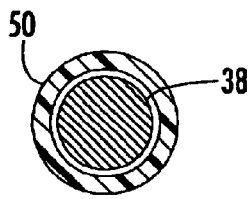
FIG. 3 is a cross sectional view taken along line 3—3 of FIG. 2.

Referring now to FIGS. 2 and 3, the construction of tire lifting tool 34 will be described. As shown, tire lifting tool 34 includes an elongate rod 38 integrally extending from a handle portion 40 into a bead puller 42. Bead puller 42 includes a hooking lip 44 located at the end of elongate rod 38. In this case, elongate rod 38 defines a bend 46 which provides clearance when used on a center mounting tire changer.

Lifting tool 34 further includes a slidable boot 48 located on elongate bar 38. Boot 48 has a tubular portion 50 through which elongate rod 38 is received. A positioner 52 integrally extends from tubular portion 50 as shown. A seating protrusion 54 is located adjacent the end of positioner 52. As can be seen, hooking lip 44 and seating protrusion 54 are oriented in opposite directions.

Generally, elongate rod 38 will be made of a suitable material to achieve appropriate rigidity, such as hardened steel. Boot 48, on the other hand, is preferably formed from a flexible material, such as a suitable polymer. For example, boot 48 may be formed from flexible nylon in presently preferred embodiments. Positioner 52 is thus allowed to pivot towards and away from bead puller 42, as indicated by arrow 56. Specifically, positioner 52 will pivot between a first position angularly spaced from bead puller 42 (as shown) and a second position juxtaposed to bead puller 42 (see FIG. 4C).

Figure 4A:
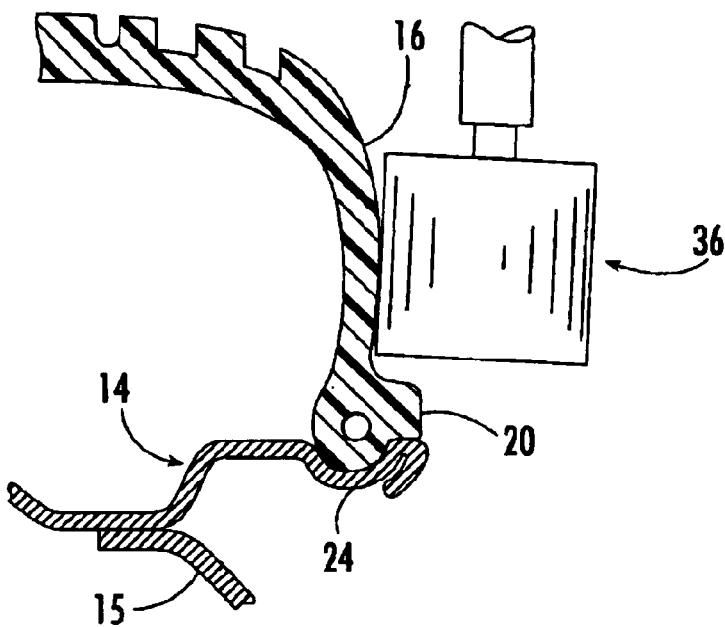
FIGS. 4A through 4F show successive steps in the removal of the tire's outer bead in accordance with the present invention.

A preferred technique for removing outer bead 20 from rim 14 will now be described with reference to the remaining drawings. As shown in FIG. 4A, roller 36 is brought into engagement with outer sidewall 16 of tire 12. A sufficient force is applied against sidewall 16 to create a gap 56 (FIG. 4B) between outer bead 20 and rim 14. Lubricant can then be applied to rim 14 in the area of groove 24.

Figure 4B:
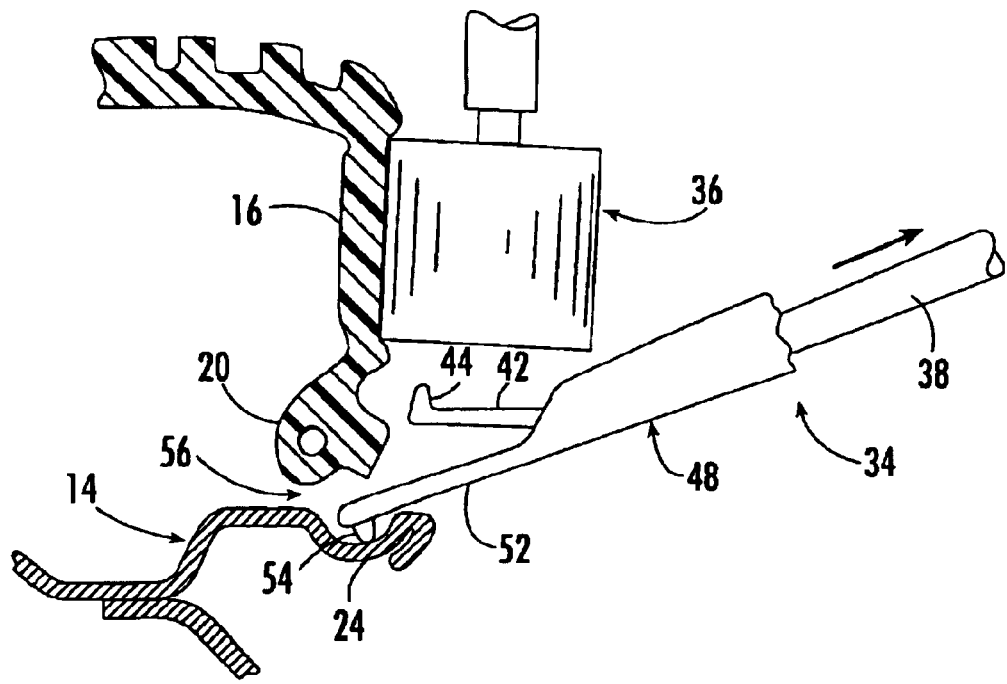

Referring now to FIG. 4B, positioner 52 of lifting tool 34 can then be inserted into gap 56. As shown, rod 38 may be retracted with respect to boot 48 in order to facilitate insertion of positioner 52. Seating protrusion 54 is then easily located in groove 24, as shown.

Figure 4C:
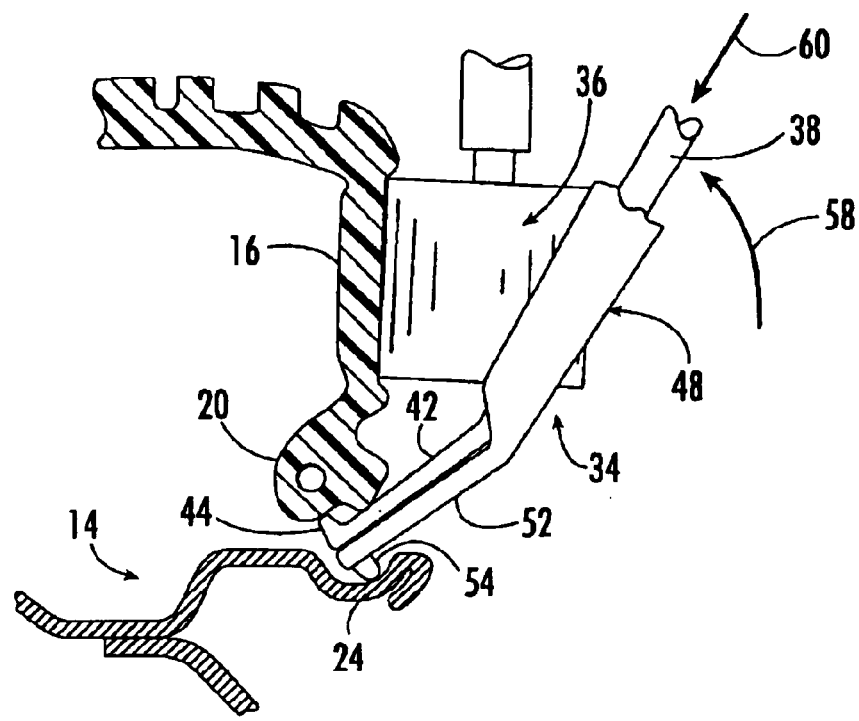

Because protrusion 54 engages groove 24, lifting tool 34 may then be rotated sharply upward, as indicated by arrow 58 of FIG. 4C. This causes positioner 52 to pivot into juxtaposition with bead puller 42. Moreover, rod 38 can then be moved with respect to boot 48 such that hooking lip 44 and seating protrusion 54 are approximately aligned.

Figure 4D:
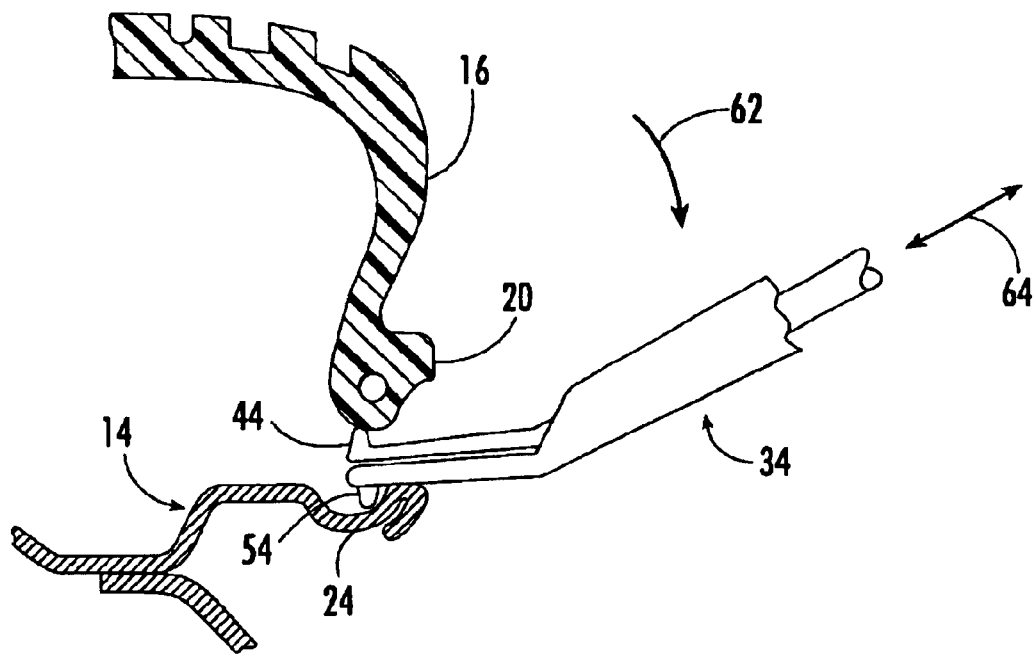
Figure 4E:
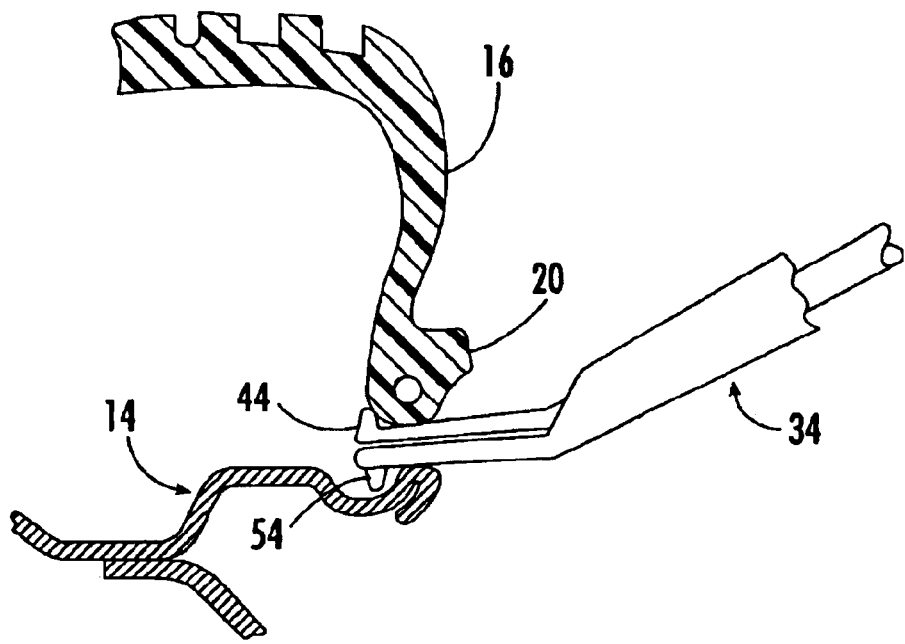

In FIG. 4D, roller 36 has been moved away from sidewall 16. Lifting bar 34 is rotated downward, as indicated by arrow 62, in order to lift bead 20 away from groove 24. Lifting bar 34 is then moved in a back and forth motion (as indicated by arrow 64) to assure that hooking lip 44 has fully engaged the back side of outer bead 20 (as illustrated in FIG. 4E).

Figure 4F:
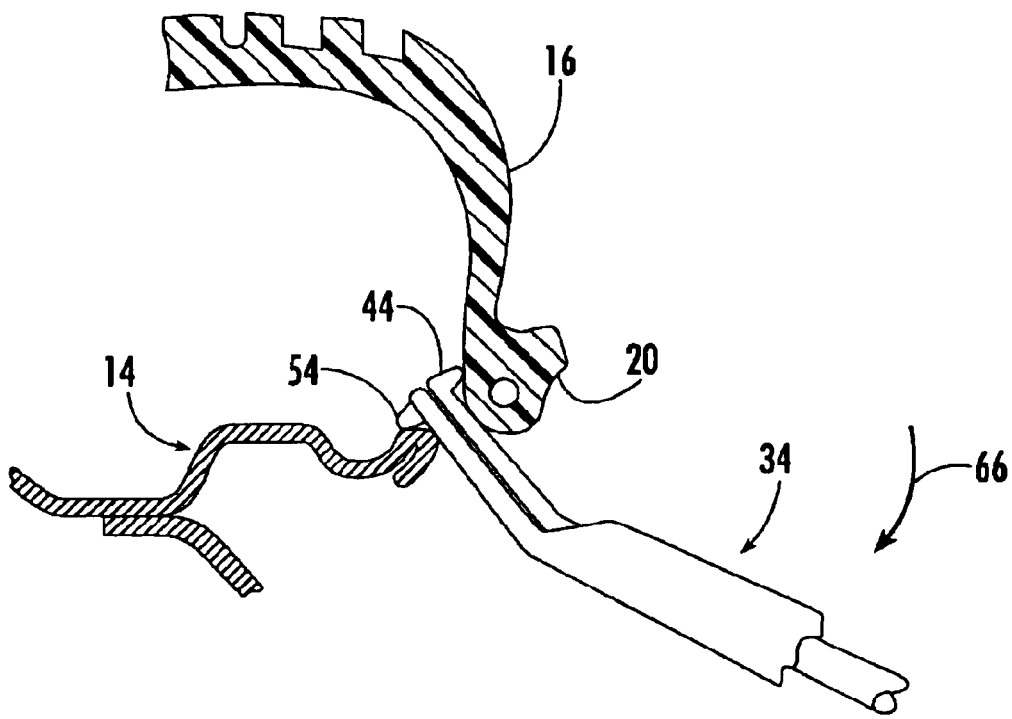

The last removal step is shown in FIG. 4F. With hooking lip 44 engaging the back side of bead 20, lifting bar 34 is further rotated (as indicated by arrow 66) about the outer edge of rim 14. At this time, bead 20 will disengage the rim.

While preferred embodiments of the invention have been shown and described, modifications and variations may be made thereto by those of ordinary skill in the art without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the present invention. Therefore, it is contemplated that any and all such modifications are included in the present invention as may fall within the literal and equivalent scope of the appended claims.

What is claimed is:

1. A method of separating the bead of a tire from a rim to which it is mounted in a tire/rim combination, said method comprising steps of:

(a) providing a tire lifting device having a working end including a rigid bead puller and a flexible positioner;

(b) depressing a sidewall of said tire to produce a gap between said bead and said rim;

(c) inserting said working end of said tire lifting device into said gap such that said flexible positioner engages said rim and said bead puller engages said bead; and (d) moving said tire pulling device such that said bead is pulled over said rim.

2. A method as set forth in claim 1, wherein said tire lifting device comprises an elongate rod defining said bead puller and an integral handle portion, said flexible positioner being carried on said elongate rod.

3. A method as set forth in claim 2, wherein said flexible positioner forms a portion of a slidable boot located on said elongate rod.

4. A method as set forth in claim 3, wherein step (c) is performed by: first, moving said slidable boot with respect to said elongate rod to seat said positioner; and second, moving said bead puller into engagement with said bead.

5. A method as set forth in claim 1, wherein said bead puller defines a hooking lip at an end thereof and said flexible positioner defines seating protrusion said hooking lip and said seating protrusion being oriented in opposite directions.

6. A method as set forth in claim 5, wherein said seating protrusion is seated in a bead groove of said rim in step (c).

7. A method as set forth in claim 1, wherein said sidewall is depressed in step (b) utilizing a roller.

8. A method as set forth in claim 1, wherein said tire/rim combination is a pax system tire/rim combination.

9. A tire lifting device comprising:

an elongate rod having a handle portion integrally into a bead puller defining a hooking lip at an end thereof;

a positioner carried by said elongate rod, said positioner defining a seating protrusion orientated in an opposite direction to said hooking lip; and said positioner being pivotable between a first position such that said seating protrusion is angularly spaced from said hooking lip and a second position juxtaposed thereto.

10. A tire lifting device comprising:

an elongate rod having a handle portion integrally extending into a bead puller defining a hooking lip at an end thereof;

a positioner carried by said elongate rod, said positioner defining a seating protrusion oriented in an opposite to direction said hooking lip;

said positioner being pivotable between a first position angularly spaced from said bead puller and a second position juxtaposed thereto; and said positioner forming a portion of a slidable boot located on said elongate rod.

11. A tire lifting device as set forth in 10, wherein said slidable boot comprises a tubular portion through which said elongate rod is received, said positioner integrally extending from said tubular portion.

12. A tire lifting device as set forth in claim 10, wherein said slidable boot is made of a flexible polymeric material.

* * * * *